(12) United States Patent
Henry et al.

(10) Patent No.: US 10,384,291 B2
(45) Date of Patent: Aug. 20, 2019

(54) WELD ENDING PROCESS AND SYSTEM

(71) Applicant: Lincoln Global, Inc., City of Industry, CA (US)

(72) Inventors: Judah Henry, Geneva, OH (US); William T. Matthews, Chesterland, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 544 days.

(21) Appl. No.: 14/610,238

(22) Filed: Jan. 30, 2015

(65) Prior Publication Data

US 2016/0221105 A1    Aug. 4, 2016

(51) Int. Cl.
*B23K 9/12* (2006.01)
*B23K 9/095* (2006.01)

(52) U.S. Cl.
CPC .............. *B23K 9/124* (2013.01); *B23K 9/095* (2013.01)

(58) Field of Classification Search
CPC ................................ B23K 9/095; B23K 9/124
See application file for complete search history.

(56) References Cited

U.S. PATENT DOCUMENTS

| | | | | | |
|---|---|---|---|---|---|
| 3,112,392 | A * | 11/1963 | Orr | ........................ | B23K 9/173 |
| | | | | | 219/137.42 |
| 3,188,375 | A * | 6/1965 | Adamson | ................ | B23K 9/007 |
| | | | | | 219/130.5 |
| 4,538,047 | A * | 8/1985 | Nakano | ..................... | B23K 9/12 |
| | | | | | 219/124.34 |
| 4,889,969 | A * | 12/1989 | Kawai | ..................... | B23K 9/091 |
| | | | | | 219/130.21 |
| 6,627,850 | B1 * | 9/2003 | Koga | ................... | B23K 9/0956 |
| | | | | | 219/137 PS |
| 6,683,271 | B2 * | 1/2004 | Rogers | .................... | B05B 7/224 |
| | | | | | 219/137.71 |
| 6,906,284 | B2 * | 6/2005 | Kim | ....................... | B23K 9/095 |
| | | | | | 219/130.21 |
| 7,767,933 | B2 * | 8/2010 | Matus | .................. | B23K 9/1006 |
| | | | | | 219/130.1 |

(Continued)

FOREIGN PATENT DOCUMENTS

DE    4204661    * 6/1993
JP   35515672    * 12/1980

(Continued)

OTHER PUBLICATIONS

TransPuls Synergic, Fronius International, 16 pages.

*Primary Examiner* — Ibrahime A Abraham
*Assistant Examiner* — Frederick F Calvetti
(74) *Attorney, Agent, or Firm* — David J. Muzilla (57) ABSTRACT

An electric arc welding system and method includes providing a welding apparatus having at least a welding power supply, a wire feeder configured to supply a welding wire, a welding gun having an opening from which the welding wire extends, and a welding controller. The controller can initiate a weld ending process, which senses any contact between the welding wire and a workpiece. In response to any such contact, the controller executes a wire material transfer routine to transfer molten material of the welding wire from the welding wire to the workpiece. This routine can be repeated until the wire feeder stops advancing the welding wire towards the workpiece during the weld ending process.

16 Claims, 6 Drawing Sheets

(56) References Cited

U.S. PATENT DOCUMENTS

| | | | | |
|---|---|---|---|---|
| 7,960,672 B2* | 6/2011 | Nishimura | ............ | B23K 9/0671 219/125.1 |
| 8,581,146 B2* | 11/2013 | Daniel | ................... | B23K 9/124 219/137 R |
| 2004/0016735 A1* | 1/2004 | Huismann | ............ | B23K 9/0735 219/137.71 |
| 2004/0188406 A1* | 9/2004 | Brabander | ............ | B23K 9/067 219/137.61 |
| 2004/0262280 A1* | 12/2004 | Kim | ....................... | B23K 9/095 219/130.21 |
| 2006/0076332 A1* | 4/2006 | Matus | ................... | B23K 9/1006 219/130.21 |
| 2006/0138115 A1* | 6/2006 | Norrish | ................... | B23K 9/09 219/137.71 |
| 2007/0102411 A1* | 5/2007 | Takano | ................... | B23K 9/125 219/137.71 |
| 2008/0041834 A1* | 2/2008 | Nishimura | ............ | B23K 9/0671 219/125.1 |
| 2008/0156781 A1* | 7/2008 | Artelsmair | ............. | B23K 9/091 219/130.5 |
| 2010/0096375 A1* | 4/2010 | Daniel | ................ | B23K 9/0735 219/137.31 |
| 2011/0114609 A1* | 5/2011 | Kroiss | .................... | B23K 9/133 219/121.11 |
| 2012/0074112 A1* | 3/2012 | Kotera | ................. | B23K 9/0671 219/124.1 |
| 2012/0145689 A1* | 6/2012 | Hillen | .................... | B23K 9/095 219/130.1 |
| 2012/0145690 A1* | 6/2012 | Kawamoto | ............ | B23K 9/067 219/130.5 |
| 2012/0199566 A1* | 8/2012 | Hillen | .................... | B23K 9/095 219/130.1 |
| 2012/0305531 A1 | 12/2012 | Keong et al. | | |
| 2013/0146575 A1* | 6/2013 | Hillen | ................... | B23K 9/125 219/137.71 |
| 2013/0228559 A1* | 9/2013 | Daniel | ................ | B23K 9/0671 219/130.33 |
| 2014/0131332 A1* | 5/2014 | Henry | ................. | B23K 9/0671 219/130.21 |
| 2018/0304391 A1* | 10/2018 | Kotera | ................. | B23K 9/0953 |

FOREIGN PATENT DOCUMENTS

| | | | |
|---|---|---|---|
| JP | 357088978 | * | 6/1982 |
| JP | 60221175 | * | 11/1985 |
| JP | H09267171 A | | 10/1997 |
| JP | 2007275995 A | | 10/2007 |

* cited by examiner

WELD ENDING PROCESS AND SYSTEM

The present invention relates to the art of electric arc welding and more particularly to an electric arc welder that executes a wire material transfer routine during a weld ending process.

BACKGROUND OF THE INVENTION

In electric arc welding, a popular welding process uses a solid wire electrode fed with a wire feeder. At the start of welding, an arc must be established between the electrode tip and the workpiece. When the tip of the electrode includes contamination, damage, and/or hardened material that was previously molten material, it can be difficult to establish the arc. These conditions can be caused by the electrode wire continuing to feed through the wire feeder after the wire feeder is signaled to stop feeding wire. In particular, a response lag associated with stopping the wire feeder can cause the electrode wire to make contact with the workpiece after the welder has stopped welding.

In view of the foregoing problems and shortcomings of existing welding apparatus, the present application describes a system and method to overcome these shortcomings.

SUMMARY OF INVENTION

In one embodiment, electric arc welding includes providing a welding apparatus having at least a welding power supply, a wire feeder configured to supply a welding wire, and a welding gun having an opening from which the welding wire extends, initiating a weld ending process, sensing contact between the welding wire and a workpiece, and executing a wire material transfer routine to transfer molten material of the welding wire from the welding wire to the workpiece, where the wire material transfer routine is repeated until the wire feeder stops advancing the welding wire towards the workpiece during the weld ending process.

The descriptions of the invention do not limit the words used in the claims in any way or the scope of the claims or invention. The words used in the claims have all of their full ordinary meanings.

BRIEF DESCRIPTION OF THE DRAWINGS

In the accompanying drawings, which are incorporated in and constitute a part of the specification, embodiments of the invention are illustrated, which, together with a general description of the invention given above, and the detailed description given below, serve to exemplify embodiments of this invention.

DETAILED DESCRIPTION

The following includes definitions of exemplary terms used throughout the disclosure. Both singular and plural forms of all terms fall within each meaning:

"Logic," synonymous with "circuit" as used herein, includes but is not limited to hardware, firmware, software and/or combinations of each to perform a function(s) or an action(s). For example, based on a desired application or needs, logic may include a software controlled microprocessor, discrete logic such as an application specific integrated circuit (ASIC), or other programmed logic device and/or controller. Logic may also be fully embodied as software.

"Software", as used herein, includes but is not limited to one or more computer readable and/or executable instructions that cause a computer, logic, or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

Figure 1:
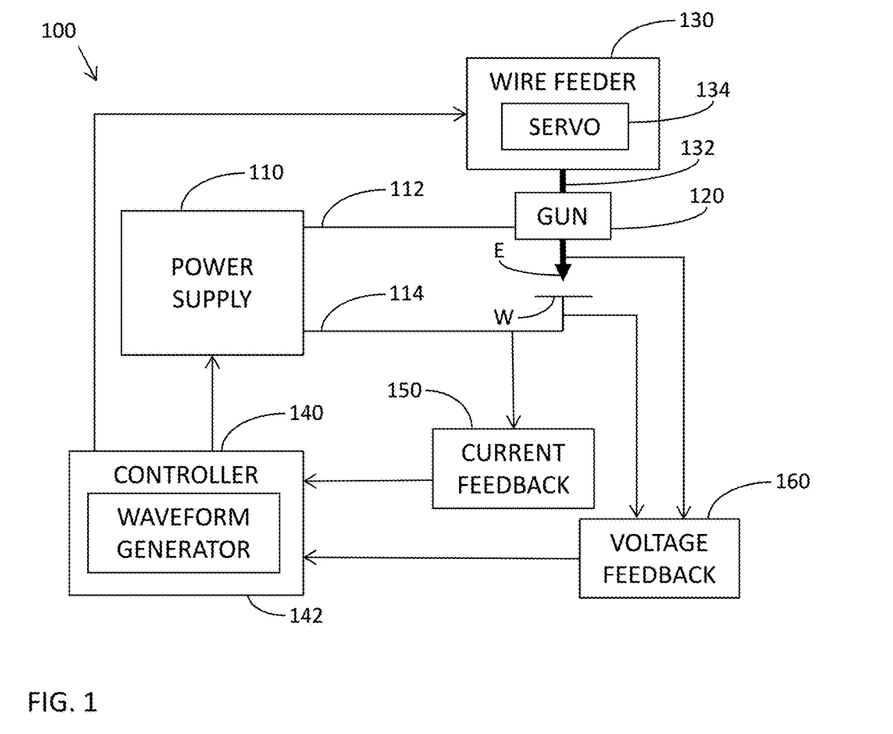
FIG. 1 is an exemplary block diagram and system architecture for an exemplary welder for performing an embodiment of the present invention.

Referring now to the drawings, which are for the purpose of illustrating exemplary embodiments of the invention only and not for the purpose of limiting same, FIG. 1 shows a block diagram of an exemplary welding system 100. The welding system 100 may include a power supply 110, such as a high speed switching power supply, a welding gun 120, a wire feeder 130, and a controller 140. The welding system 100 may support various types of electric arc welding processes, including, for example, gas metal arc welding (GMAW), Flux Cored Gas Shielded (FCAW-G), Flux Cored Self Shielded (FCAW-S), etc. The exemplary power supply 110 provides power through output lines 112, 114, which are connected to an electrode E and a workpiece W. During welding, an arc forms between a tip of the electrode E and the workpiece W (see also FIG. 2). The exemplary wire feeder 130 feeds welding wire 132 through the welding gun 120 towards the workpiece W. During welding, the wire 132 functions as the electrode E at the arc, where the wire 132 is melted into molten material and deposited onto the workpiece W. In one embodiment, the wire feeder 130 includes a servo motor 134 that pulls wire 132 from a wire source, such as, for example, a wire spool, at a wire feed speed dictated by the controller 140.

The welding system 100 may also include a current feedback means 150 and a voltage feedback means 160. These feedback means 150, 160 may include various sensors, circuits, etc., for providing current and voltage feedback, respectively, associated with output lines 112, 114 to the controller 140. The exemplary controller 140 controls the power supply 110 and the wire feeder 130 based on the desired welding process and feedback. The controller 140 may include various weld settings and inputs for specifying various welding parameters. The controller 140 may also include logic and a memory, including, for example, look-up tables, for determining and executing various welding routines, processes, parameters, etc.

The controller 140 may include a waveform generator 142 for creating various waveforms associated with the welding system 100, for a variety of welding processes, applications, conditions, input settings, parameters, etc. For example, when the welding system 100 is configured for a GMAW process, the waveform generator 142 may implement one of various waveforms associated with various GMAW-type welding processes or embodiments, such as, for example, short-circuit metal transfer, globular transfer, axial spray transfer, pulsed spray transfer, etc. In any of these various embodiments, combinations and variations of voltage and current over time may be regulated to define high frequency pulses, which may be used to control the transfer of molten material from the electrode E to the workpiece W during welding. It should be appreciated that any of the components and devices described above may be combined or divided into other devices, while still including the same capabilities. For example, the power supply 110 and the controller 140 may be combined into unit, such as, for example, the Lincoln Electric Power Wave® Series of welding machines.

Figure 7:
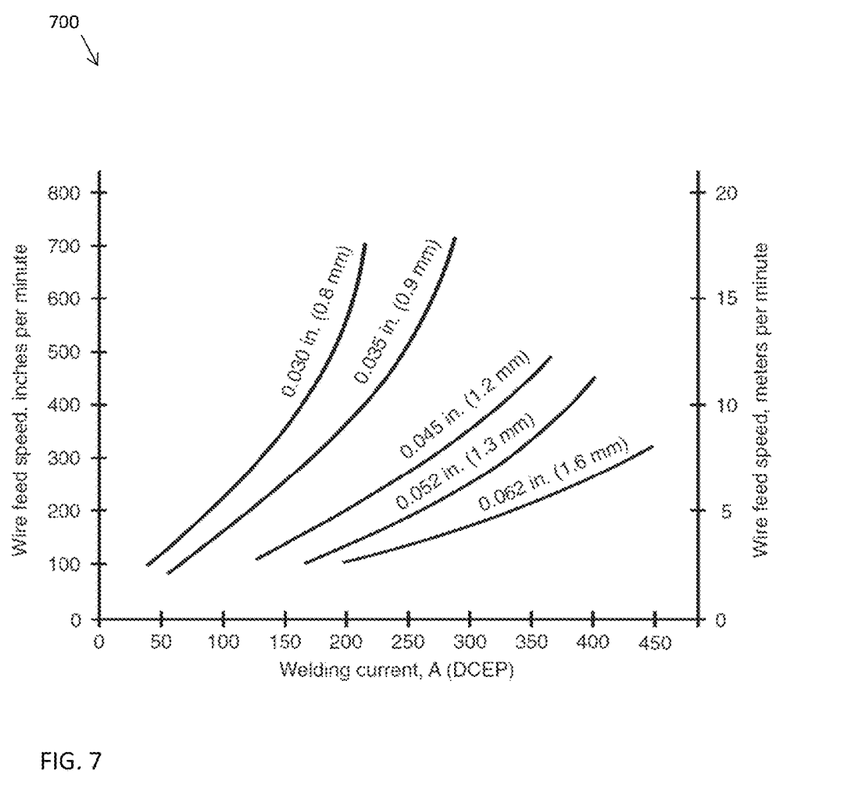
FIG. 7 includes a table showing exemplary welding currents versus exemplary wire feed speeds.

In various embodiments, the welding system 100 may be an automatic system, a semi-automatic system, or a manual system. Each of these embodiments may include various other associated devices, equipment, and/or capabilities. For example, in one semi-automatic embodiment, the welding gun 120 includes a trigger in operative communication with the controller 140 for signaling when to start and stop welding. In one automatic embodiment, the welding gun 120 is mounted to a robot in operative communication with the controller 140, where start and stop welding signals are in accordance with an automated welding sequence. In all of these embodiments, the controller 140 may control the wire feeder 130 in accordance with welding rates, current, and/or the weld start and stop signals. I.e., the controller 140 communicates to the wire feeder 130 a wire feed rate (e.g., a wire feed speed (WFS) signal), including when to start and stop feeding the welding wire 132 through the gun 120 towards the workpiece W in a coordinated manner with welding. Typically, WFS and current are related such that the wire feed rate increases with current. The table 700 included in FIG. 7 shows exemplary welding currents versus wire feed speeds.

Figure 2:
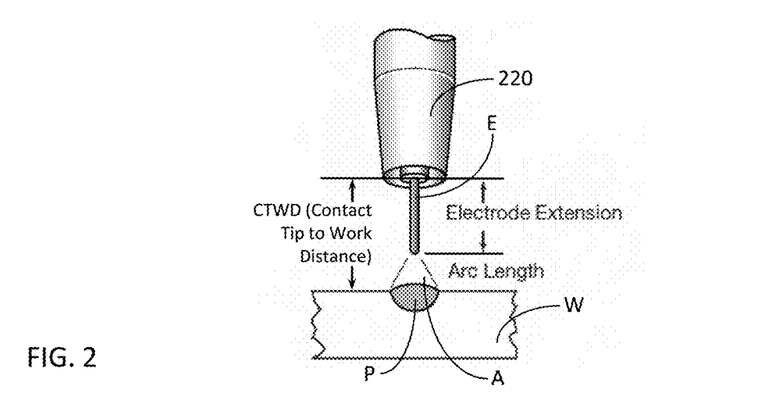
FIG. 2 is a drawing of an exemplary electrode and workpiece during welding.

With further reference to FIG. 2, which shows an exemplary electrode E during welding, as the electrode E advances toward the workpiece W from exemplary welding gun 220, an arc A is established across the gap between the electrode E and the workpiece W. The length of the electrode E extending from the end of the contact tip of the gun 220 to the arc A is the electrode extension. Another term for electrode extension is electrical stickout (ESO). In GMAW, this is the amount of electrode E that is visible to the welder. The electrode extension includes only the length of the electrode E, not the extension plus the length of the arc A. The use of the term electrode extension is more commonly used for semi-automatic welding than it is for automatic welding, such as, for example, robotic or mechanized welding operations. Contact tip to work distance (CTWD) is a term typically used in automatic welding. CTWD is measured from the end of the contact tip to the workpiece W.

For example, in short-circuiting metal transfer (GMAW-S) embodiments, such as semi-automatic welding, the electrode extension may be between about ⅜"-½" (10-12 mm). For either axial spray or pulsed spray metal transfer (GMAW-P) embodiments, the electrode extension may be between about ¾"-1" (19-25 mm). Maintaining the correct electrode extension is important to the uniformity of the penetration profile along the length of a weld, and it is considered to be an important variable for any GMAW process.

During welding, as the tip of electrode E melts in the presence of the arc A, molten material is transferred or deposited onto the workpiece W at weld puddle/pool P, which is an area of molten material composed of electrode E and workpiece W materials. Depending on the selected welding process, molten material from the electrode E may be in constant contact with the pool P, molten drops may be fed/dropped into the pool P, and/or molten droplets may be sprayed into the pool P. In any of these embodiments, the solid portion of the electrode E may be very close to the pool P, separated only by size of the molten portion of the electrode E and/or the arc length.

Figure 3:
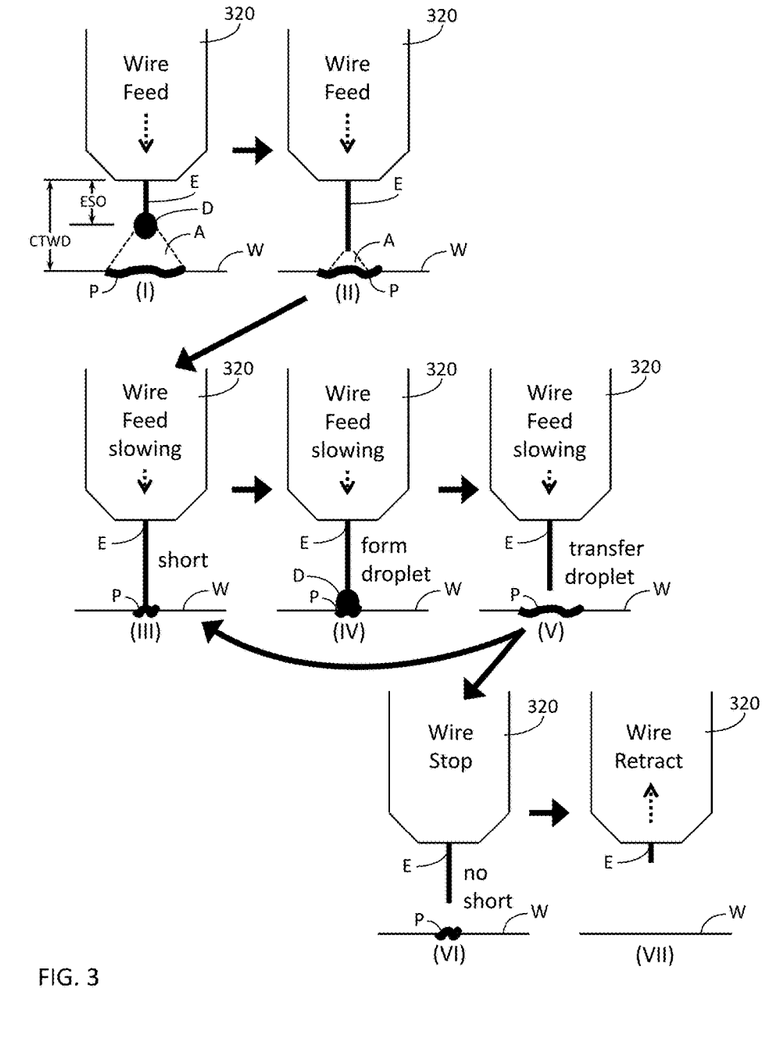
FIG. 3 shows an exemplary welding gun, electrode, arc, workpiece, and weld pool at various stages of an exemplary welding process.

FIG. 3 shows an exemplary welding gun 320, electrode E, arc A, workpiece W, and weld pool P at various stages (I-VII) of an exemplary welding process, including an exemplary weld ending process. In this embodiment, for exemplary purposes, a GMAW-P welding process is shown, where the CTWD is about 20 mm and the ESO is about 10 mm. At stage (I), the welding process is shown in the active welding mode, with a droplet D about to be transferred from the electrode E to the pool P on the workpiece W. During stage (I), wire is fed through gun 320 at a WFS and the electrode E is continuously melted at the arc A with droplets D deposited into the workpiece W at the pool P.

Also during stage (I), the current is at a welding current level. For example, in one embodiment, the welding current can be at a high current (e.g., about 300-350 amps) during an axial spray transfer welding process. In another embodiment, the welding current can alternate between a peak current (e.g., about 450 amps) and a lower background current (e.g., about 100 amps) during a pulsed spray transfer welding process. In this embodiment, during the peak current, the high point of the period, a single droplet D of molten material is detached and transferred across the arc A to the workpiece W. The descent to the lower background current provides arc stability and is largely responsible for the overall heat input into the weld. The frequency is the number of times the period occurs per second, or cycles per second. The frequency of the period increases in proportion to the WFS.

At stage (II), a weld ending process can be initiated based on a shutdown command, which may be, for example, from an automatic weld sequence during robotic welding or the release of a welding gun trigger by an operator during a semi-automatic welding. During the weld ending process, the WFS signal commands the wire feeder to stop feeding the wire through the gun 320 and the current reduces to a low level, which may be below the background current (e.g., about 20 amps). Although the controller has signaled the wire feeder to stop feeding wire at stage (II), processing delays, the momentum of the wire feeder (e.g., by feeding wire at upwards of 700 inches per minute), etc. can prevent the wire from stopping instantaneously. Thus, wire is still feeding through the gun 320 towards the workpiece W for a time after the wire feeder receives the signal to stop. In addition, at stage (II), the current is not sufficient to create or transfer any molten material from the tip of the electrode E to the workpiece W.

Under these conditions, because the electrode E wire is still moving towards the workpiece W, it is common for the tip of the electrode E to "stub out" or make contact with the workpiece W. This can result in damage, including, for example, bending, to the tip of the electrode E and/or the build-up of molten material on the tip of the electrode E. For example, molten material can adhere to the tip of the electrode E when the electrode E makes contact with the pool P of the workpiece W. In addition, the molten material can be from molten material, such as, for example, a droplet D, that started to form before the weld process ended, but before the molten material was transferred to the workpiece W. Once cooled, the shape and/or composition of the hardened material on the tip of the electrode E can cause problems with establishing the arc for the next weld, including, for example, a dull and/or irregular shape of the tip from molten material, silicone residue on the surface of the tip from molten material, a bent tip of the wire, etc.

To prevent these conditions, the weld ending process can execute a wire material transfer routine to repeatedly create and transfer molten material from the electrode E to the workpiece W until the wire feeder stops advancing wire towards the workpiece W during the weld ending process. In one embodiment, the wire material transfer routine can be a droplet transfer routine that repeatedly creates and transfers droplets of molten material from the electrode E to the workpiece W. Referring now to stage (III) of FIG. 3, the electrode E is shown contacting the workpiece W at the pool P. This contact can be sensed by the controller's droplet transfer routine, for example, by sensing voltage. (See, e.g., voltage feedback 160 across output lines 112, 144 shown in FIG. 1.) In one embodiment, when the electrode E makes contact with the workpiece W, it is sensed as an electrical "short" between the electrode E and the workpiece W.

In response to a short, as shown in stage (IV) of FIG. 3, a wire material transfer routine, shown here as a droplet transfer routine, increases the current through the electrode E and the workpiece W to form and then transfer a molten droplet D from the electrode E to the workpiece W. Stage (V) of FIG. 3 shows the electrode E, workpiece W, and pool P after the droplet D, which forms in stage (IV), is transferred to the pool P. The droplet transfer routine of the weld ending process continues to sense any contact between the electrode E and the workpiece W if the wire is still feeding through the gun 320 towards the workpiece W. Stages (III) through (V) are repeated (e.g., up to N number of times) until the wire stops feeding through the gun 320. In various embodiments, the wire material transfer routine may execute for around 100 ms or more, depending on the WFS, wire feeder, CTWD, etc.

At stage (VI) of FIG. 3, the electrode E, workpiece W, and pool P are shown after the wire has stopped feeding through the gun 320. In this embodiment, where contact between the electrode E and workpiece W is determined by sensing a short, no short is sensed. At this stage, the weld ending process may proceed to retract all or a portion of the wire extending from the electrode or ESO distance back into the gun 320. The retract distance may be determined based on the ESO, CTWD, etc., including using a look-up table associated with the controller. For example, in one embodiment, where the CTWD is 20 mm, the retract distance may be between about 19-21 mm. In another embodiment, the retract distance may be about half the CTWD or about 10 mm. Generally, the retract distance may be any distance that sufficiently protects the wire, which may be based on other factors besides ESO and CTWD, such as, for example, the proximity of the contact tip to potential obstacles between welds, if a weld sequence is completed and the contact tip will be moved to a home or storage position, etc. In some embodiments, the retract distance will vary from weld to weld. In these embodiments, retracting the wire the selected retract distance protects the tip of the electrode E within the contact tip while the gun is moved.

The wire material transfer routine may utilize any applicable process to melt and transfer electrode E wire material from the electrode E to the workpiece W, including, for example, the creation and transfer of molten droplets. For example, the wire material transfer routine may include use of a short-circuit metal transfer routine, short arc response routine, short clearing routine, surface tension transfer (STT) routine, etc. In various embodiments, in response to contact (e.g., measured as a short) these routines can quickly ramp up the current (e.g., at about 50-100 amps per millisecond) to melt electrode E material and increase the pinch force acting on the molten material to transfer the molten material from the electrode E to the workpiece W. In some embodiments, the current is increased until a voltage spike is sensed, indicating that the short has cleared (i.e., the molten material has transferred to the workpiece W and that there is no longer any material making contact between the electrode E and the workpiece W).

Figure 4:
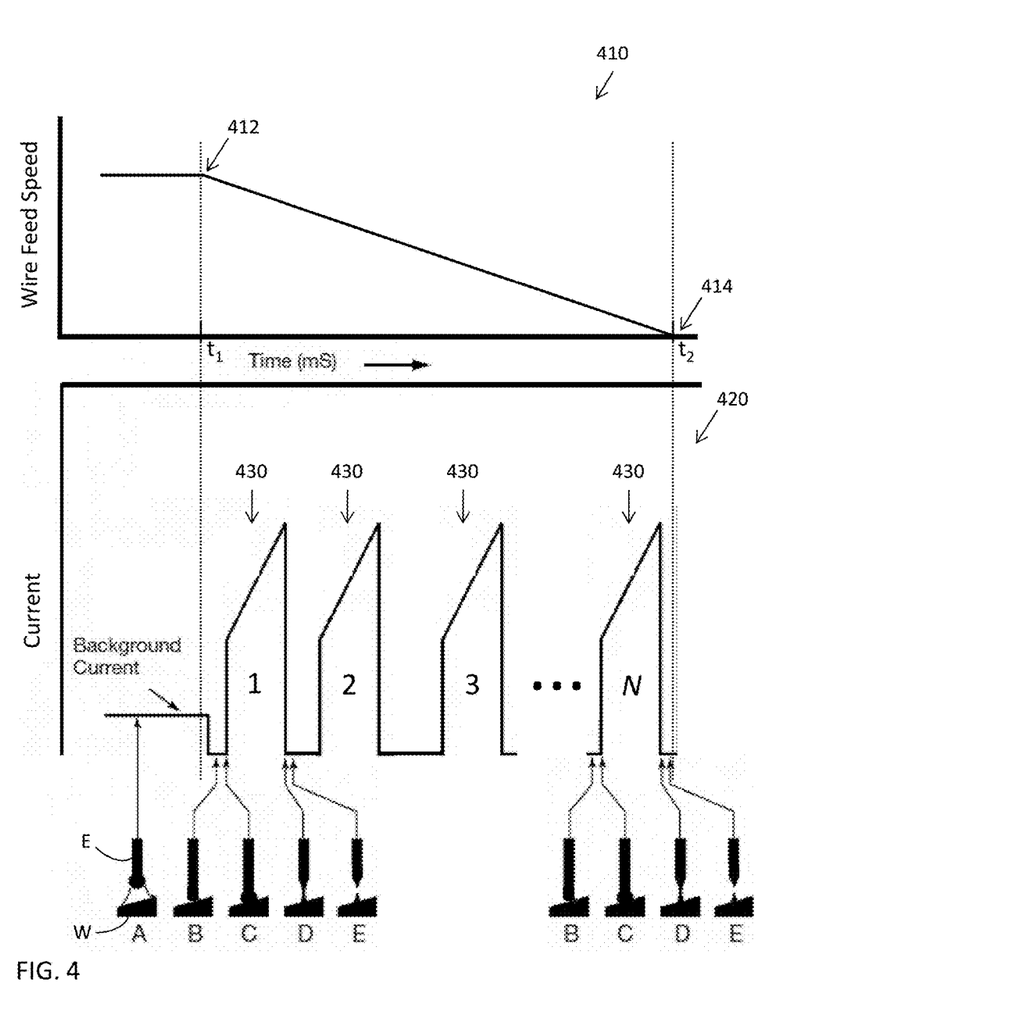
FIG. 4 is a chart showing exemplary timing and waveforms associated with an embodiment including an exemplary droplet transfer routine during a weld ending process.

For example, FIG. 4 shows an embodiment where an STT routine is utilized as the wire material transfer routine (e.g., in this case a droplet transfer routine) during the weld ending process. The WFS 410 is shown above the current 420 along the same time line. Before time $t_1$, a weld process executes with a certain WFS and current, including peak and background currents sufficient to melt and transfer molten droplets from the tip of the electrode E to the workpiece, as shown at A. At time $t_1$, a weld ending process is initiated. In accordance with a signal to the wire feeder to stop feeding wire at time $t_1$, the WFS starts to decrease until time $t_2$, when the wire feed actually stops. FIG. 4 shows an exemplary WFS reduction from point 412 to point 414, which correspond to times $t_1$ and $t_2$, respectively. For simplicity, the WFS 410 is shown reducing in a linear fashion between times $t_1$ and $t_2$. However, the WFS may also reduce in various non-linear fashions. The weld ending process and droplet transfer routine can accommodate variations in wire speed over time, including increases.

Also at time $t_1$, in accordance with the weld ending process, the current is reduced to a weld ending current below the background current. As mentioned above, the weld ending current is not sufficient to melt and transfer molten material from the tip of the electrode E to the workpiece W. As described above, since the wire feeder cannot stop the WFS 410 instantaneously, the electrode E may make contact with the workpiece W, as shown in B. In response, an STT droplet transfer routine executes to transfer a molten droplet of welding wire from the electrode E to the workpiece W. Stages C, D, and E show a current waveform 430 associated with creating and transferring a molten droplet of material from the electrode E to the workpiece W, including the increase and decrease of current, during the STT droplet transfer routine.

In particular, the current can ramp up quickly to create a droplet (see C) and to a point where the pinch force associated with the rise in current (electromagnetic force) can start to neck down the molten column of the electrode (see D). The power source at this point can begin to monitor the changes in voltage over time as it relates to the necking of the molten droplet, while the molten metal is still in contact with the molten weld pool on the workpiece W. Via the voltage sensing means, the power source can reference the observed voltage and continuously compare the new voltage value to the previous voltage value. At the point where the molten metal is about to disconnect from the end of the electrode E, the power source can reduce the current to a lower than background current level. At this point in the waveform 430, surface tension forces collapse and the molten droplet transfers to the workpiece W (see E). Although FIG. 4 shows waveform 430 with a particular current profile that spikes to create and transfer a droplet of electrode E wire material to the workpiece W, any waveform shape, including those with other variations in time, current, and/or voltage, etc., may be used to melt and transfer electrode E wire material from the electrode E to the workpiece W.

As shown, the STT droplet transfer routine, including waveform 430, can execute repeatedly any number of times N until the WFS equals zero. As the WFS decreases, the time between execution of the STT droplet transfer routines can increase. Repeating stages B-E of FIG. 4 corresponds to looping through stages (III)-(V) of FIG. 3 until the wire feed stops.

In this manner, after the completion of a weld and a weld ending process, the tip of the electrode E is free from hardened material that was previously molten, allowing for an easier arc initiation for the next weld. As mentioned above, further protection may be provided by retracting the wire into the gun tip.

Figure 5:
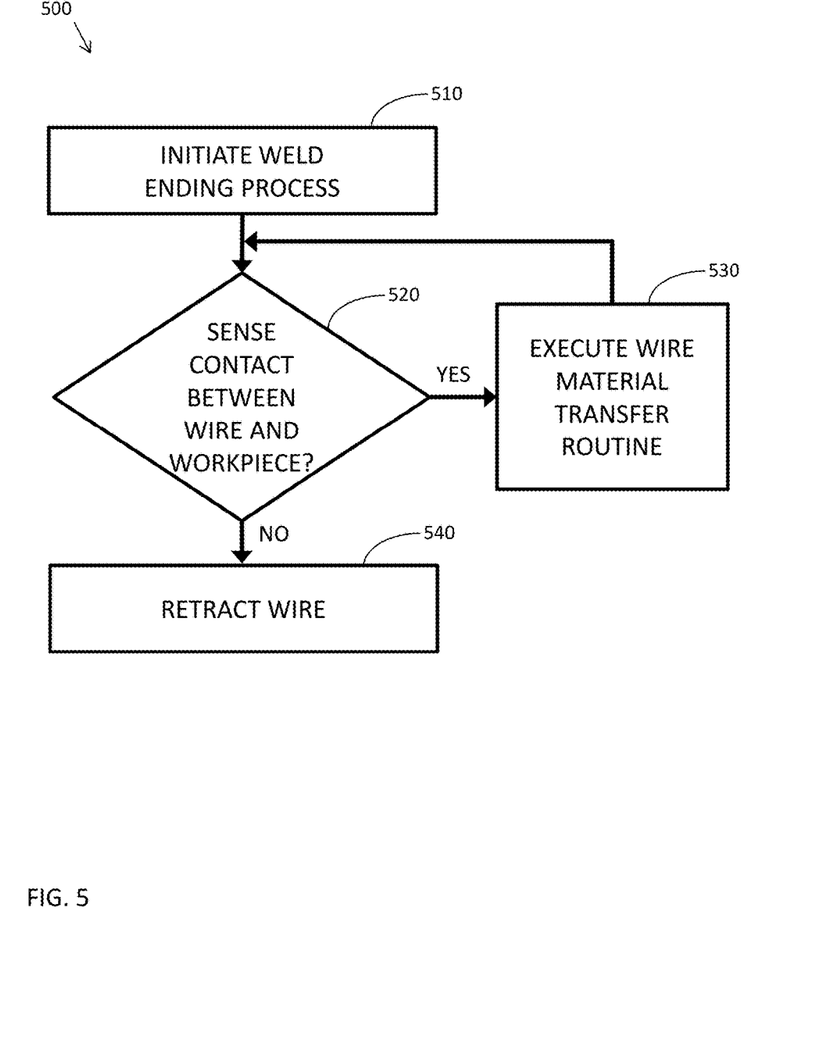
FIG. 5 is a process flow chart illustrating an exemplary methodology for executing a weld ending process.

FIG. 5 includes a process flow chart illustrating exemplary methodology/logic for executing a process. As illustrated, the blocks represent functions, actions and/or events performed therein. It will be appreciated that electronic and software applications involve dynamic and flexible processes such that the illustrated blocks can be performed in other sequences different than the one shown. It will also be appreciated by one of ordinary skill in the art that elements embodied as software may be implemented using various programming approaches such as machine language, procedural, object oriented or artificial intelligence techniques. It will further be appreciated that, if desired and appropriate, some or all of the logic/software can be embodied as part of a device's operating system and/or in the device's controller.

In the flowchart, the elements denote "processing blocks" and represent logic, computer software instructions and/or groups of instructions. The diamond shaped elements denote "decision blocks" and represent logic, computer software instructions and/or groups of instructions which affect the execution of the computer software instructions represented by the processing blocks. Alternatively, the processing and decision blocks represent steps performed by functionally equivalent circuits such as a digital signal processor circuit or an application specific integrated circuit (ASIC). The flow diagram does not depict syntax of any particular programming language. Rather, the flow diagram illustrates the functional information one skilled in the art may use to fabricate circuits or to generate logic/computer software to perform the processing of the system. It should be noted that many routine program elements, such as initialization of loops and variables and the use of temporary variables are not shown.

FIG. 5 shows a process flow chart illustrating an exemplary methodology/logic for executing a weld ending process 500, for example, in accordance with the processes described above. In this embodiment, at block 510, a weld ending process is initiated, for example, due to a pre-programmed ending of an automatic weld, the release of a trigger by a weld operator, etc. This step may also be associated with a controller instruction to stop a wire feeder that is feeding an electrode wire and an instruction to reduce the current of the welder (i.e., stop welding). At block 520, the process senses if there is contact between the electrode wire and a workpiece (e.g., due to continued feeding of the electrode wire). This step may involve the use of a voltage sensor/sensing circuit that monitors the voltage between the welder's output lines at the weld. If the process does sense contact between the electrode wire and the workpiece at block 520, then the process advances to block 530. At block 530, the process executes a wire material transfer routine (e.g., in accordance with the routines described above, including, for example, a droplet transfer routine) to melt and transfer the tip of the wire onto the workpiece. After executing block 530, the process continues back to block 520 to sense if there is contact between the electrode wire and the workpiece again. The loop between blocks 520 and 530 continues as long as the electrode wire continues to make contact with the workpiece. If the process does not sense contact between the electrode wire and the workpiece at block 520, then the process advances to block 540. Block 520 may include the use of a timer or other indicator of when to stop sensing if there is contact between the electrode wire and the workpiece. At block 540, the process can retract the wire to prepare for moving to the next weld.

Figure 6:
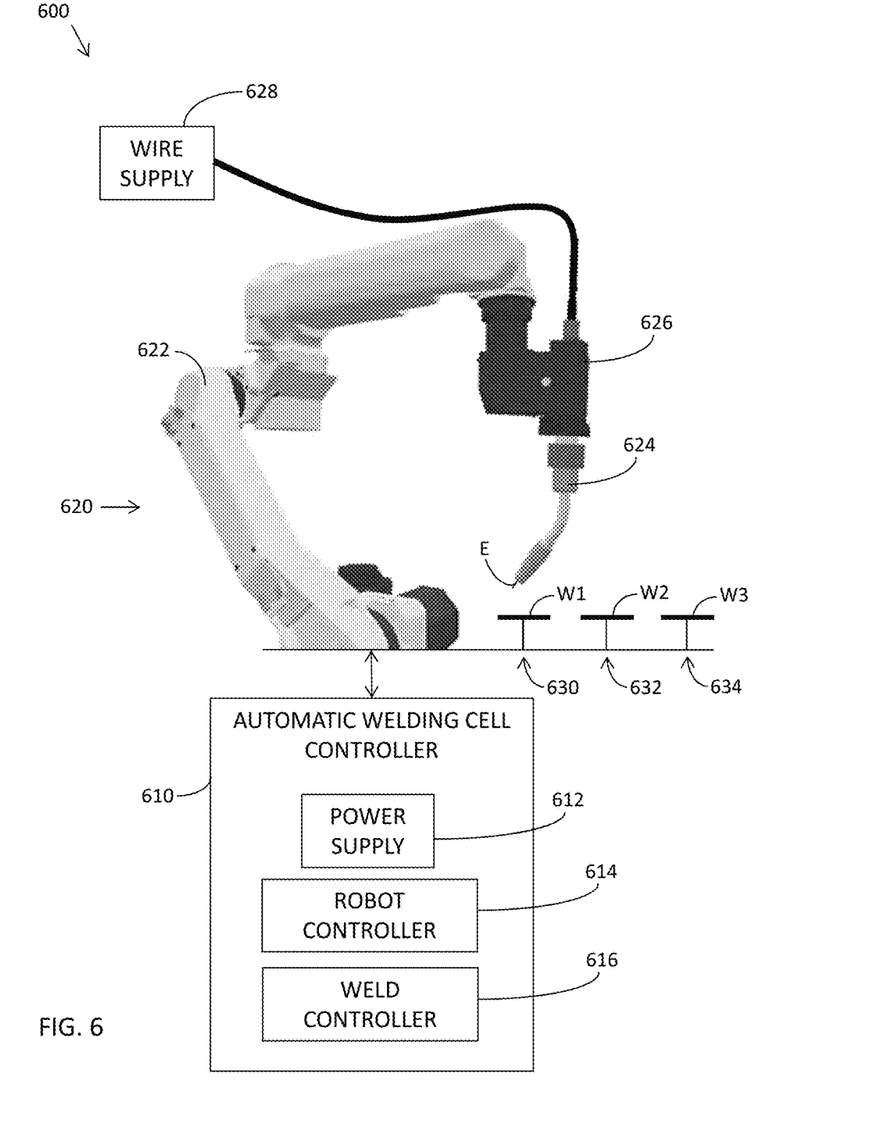
FIG. 6 is a block diagram and drawing of an exemplary welding system including an a robotic welder and automatic welding cell controller.

FIG. 6 shows an exemplary welding system 600, including a block diagram of an exemplary automatic welding cell controller 610 and an exemplary robotic welder 620. The automatic welding cell controller 610 can include a power supply 612, a robot controller 614, and a weld controller 616, along with any other devices necessary for the welding system 600, including various peripheral devices and associated controllers. The robotic welder includes a robot 622 (such as, for example, a FANUC Robotics ARC Mate® robot), a welding gun 624, and a servo controlled wire feeder 626 (such as, for example, a FANUC Robotics Servo-Torch™). The weld controller 616, power supply 612, and wire feeder 626 may be configured in the manner described in FIG. 1 above, including the associated current and voltage feedback circuits (not shown).

The servo controlled wire feeder 626 is integrated into the head of the robot 622 to directly pull wire from a wire supply 628 and feed the wire through the welding gun 624 to the electrode E. The wire supply 628 may be, for example, a spool of welding wire. The welding cell includes three weld stations 630, 632, 634 with respective workpieces W1, W2, W3.

The weld controller 616 can initiate a weld ending process when the robot 622 reaches the end of a weld at the weld stations 630, 632, 634, including executing a wire material transfer routine. The weld ending process and the wire material transfer routine can include the processes and routines mentioned above, including those shown in FIGS. 3-5.

For example, in one embodiment, at the end of the weld at weld station 630, the cell controller 610 can communicate to the robot controller 614, the weld controller 616, and the wire feeder 626 to stop welding, including stopping the wire feed. The weld controller 616 can initiate the weld ending process and sense any contact between the electrode E and the workpiece W1 until the wire feeder 626 stops the feed of wire. In response to sensing any contact between the electrode E and the workpiece W1, the controller can repeatedly execute the wire material transfer routine to melt and transfer material from the electrode E to the workpiece W1 until the wire feeder 626 stops. Once the wire feeder 626 stops the wire advancement, the weld controller 616 can command the wire feeder 626 to retract the wire into the welding gun 624 so that the wire is not damaged as the robot 622 moves the welding gun 624 into position for more welding, such as, for example, at weld station 632. This process can be repeated at the end of every weld. It should be appreciated that any of the components and devices described above may be combined or divided into other devices, while still including the same capabilities. For example, the robot controller 614 and the weld controller 616 may be combined into one controller, including, for example, the cell controller 610. Similarly, the logic associated with the various devices may be stored and executed from within various components.

While the embodiments discussed herein have been related to the systems and methods discussed above, these embodiments are intended to be exemplary and are not intended to limit the applicability of these embodiments to only those discussions set forth herein. The control systems and methodologies discussed herein may be equally applicable to, and can be utilized in, systems and methods related to arc welding, laser welding, brazing, soldering, plasma cutting, waterjet cutting, laser cutting, and any other systems or methods using similar control methodology, without departing from the spirit of scope of the above discussed inventions. The embodiments and discussions herein can be readily incorporated into any of these systems and methodologies by those of skill in the art. For example, while certain embodiments describe GMAW processes, the invention is also applicable to other welding process, including, for example, Flux Cored Gas Shielded (FCAW-G), Flux Cored Self Shielded (FCAW-S), etc.

While the present invention has been illustrated by the description of embodiments thereof, and while the embodiments have been described in some detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and methods, and illustrative examples shown and described. Accordingly, departures may be made from such details without departing from the spirit or scope of the applicant's general inventive concept.

The following is claimed:

1. A method of electric arc welding using an electric arc welder, comprising:
   providing a welding apparatus having at least a welding power supply, a wire feeder configured for feeding a welding wire, a welding controller, and a welding gun having an opening from which the welding wire extends; and
   initiating a weld ending process in response to at least one of a signal associated with stopping welding or a signal associated with releasing a trigger of the welding gun, wherein the weld ending process includes:
      commanding that the feeding of the welding wire be stopped,
      sensing contact between the welding wire and a workpiece as momentum allows the welding wire to continue to advance toward the workpiece before stopping,
      executing a wire material transfer routine in response to the sensing to transfer molten material of the welding wire from the welding wire to the workpiece,
         wherein the wire material transfer routine includes ramping up a welding current at greater than 50 to less than 100 amps per millisecond, and
         wherein the wire material transfer routine is repeated as part of the weld ending process until contact between the welding wire and the workpiece is no longer sensed, and
      retracting the welding wire once repeating of the wire material transfer routine is completed.

2. The method of claim 1, wherein retracting the welding wire comprises determining a wire retraction distance.

3. The method of claim 2, wherein the wire retraction distance is based on at least one of an electrode stick out distance and a contact tip to work distance.

4. The method of claim 1, wherein sensing contact between the welding wire and a workpiece comprises sensing an electrical short between the welding wire and the workpiece.

5. The method of claim 1, wherein the wire material transfer routine comprises a constant voltage short arc response routine or a surface tension transfer routine.

6. The method of claim 1, wherein the welding apparatus is configured for executing a gas metal arc welding (GMAW) process.

7. The method of claim 1, wherein the welding apparatus is configured for executing an automatic welding process or a semi-automatic welding process.

8. The method of claim 1, wherein the molten material of welding wire transferred from the welding wire to the workpiece is a droplet of molten material.

9. The method of claim 1, wherein the wire feeder comprises a servo feed controller.

10. A welding system, comprising:
    a welding power supply;
    a wire feeder configured for feeding a welding wire;
    a welding gun having an opening from which the welding wire extends; and
    a welding controller in operative communication with the welding power supply and the wire feeder, wherein the welding controller is configured to:
       initiate a weld ending process in response to at least one of a signal associated with stopping welding or a signal associated with releasing a trigger of the welding gun, wherein the weld ending process includes;
       commanding that the feeding of the welding wire be stopped,
       sensing contact between the welding wire and a workpiece as momentum allows the welding wire to continue to advance toward the workpiece before stopping,
       executing a droplet transfer routine in response to the sensing to transfer a molten droplet of welding wire from the welding wire to the workpiece,
          wherein the droplet transfer routine includes ramping up a welding current at greater than 50 to less than 100 amps per millisecond, and
          wherein the droplet transfer routine is repeated as part of the weld ending process until contact between the welding wire and the workpiece is no longer sensed, and
       retracting the welding wire once repeating of the droplet transfer routine is completed.

11. The system of claim 10, wherein the welding controller is configured to sense contact between the welding wire and the workpiece by sensing an electrical short between the welding wire and the workpiece.

12. The system of claim 10, wherein at least the welding power supply, the wire feeder, the welding gun, and the welding controller are configured for gas metal arc welding (GMAW).

13. The system of claim 10, wherein at least the welding power supply, the wire feeder, and the welding controller are configured for an automatic welding process.

14. The system of claim 10, wherein at least the welding power supply, the wire feeder, the welding gun, and the welding controller are configured for a semi-automatic welding process.

15. The system of claim 10, wherein the wire feeder comprises a servo feed controller.

16. A welding system, comprising:
- a welding apparatus having at least a means for supplying welding power, a means for feeding a welding wire, and a means for welding having an opening from which the welding wire extends;
- means for initiating a weld ending process in response to at least one of a signal associated with stopping welding or a signal associated with releasing a trigger of the means for welding;
- means for commanding that the feeding of the welding wire be stopped as part of the weld ending process;
- means for sensing contact between the welding wire and a workpiece as part of the weld ending process as momentum allows the welding wire to continue to advance toward the workpiece before stopping;
- means for executing a wire material transfer routine in response to the sensing, as part of the weld ending process, to transfer molten material of the welding wire from the welding wire to the workpiece;
    - wherein the wire material transfer routine, as part of the weld ending process, includes ramping up a welding current at greater than 50 to less than 100 amps per millisecond, and
    - wherein the wire material transfer routine is repeated, as part of the weld ending process, until contact between the welding wire and the workpiece is no longer sensed; and
- means for retracting the welding wire, as part of the weld ending process, once repeating of the wire material transfer routine is completed.

\* \* \* \* \*